Oct. 25, 1938.   C. E. BOLDT   2,134,596
STOCK WEANER
Filed June 15, 1936

Charles E. Boldt
INVENTOR
BY Victor J. Evans & Co.
ATTORNEYS

Patented Oct. 25, 1938

2,134,596

UNITED STATES PATENT OFFICE 2,134,596

STOCK WEANER

Charles E. Boldt, Milltown, Ind.

Application June 15, 1936, Serial No. 85,375

1 Claim. (Cl. 119—132)

This invention relates to stock weaners, and an important object thereof is to provide a weaning device that can be easily and expeditiously manually applied and removed with respect to the nose of an animal such as a cow or calf, but removal on the part of the animal or accidental loss therefrom is practically impossible.

A further object of the invention is to provide a stock weaner that is capable of performing its intended function regardless of the manner in which the animal wearing the same may attempt to nurse or draw milk from herself or another animal, yet discomfort or injury to the animals is reduced to a minimum and the device will not prevent or interfere with the animal obtaining food in any other manner.

Another object of the invention is to provide a weaning device of the character set forth, that is simple in construction, inexpensive to manufacture, and extremely efficient in use and service.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which.

Figure 2:
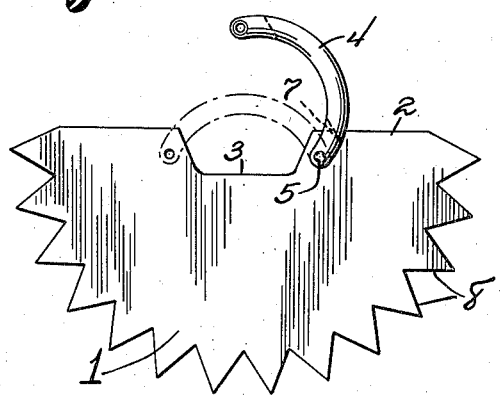
Figure 2 is an enlarged front view of the device with the attaching means therefor shown in open position in full lines and closed in dotted lines.
Figure 3:
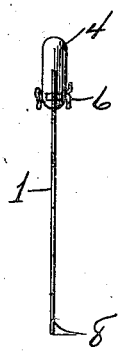
Figure 3 is an edge elevation of the device.

Referring to the drawing in detail, the reference numeral 1 indicates the body of my weaning device, which is shown as being a flat plate of semi-circular formation to provide a straight upper edge 2 and an arcuate edge providing the sides and bottom, as clearly shown in Figure 2.

Figure 1:
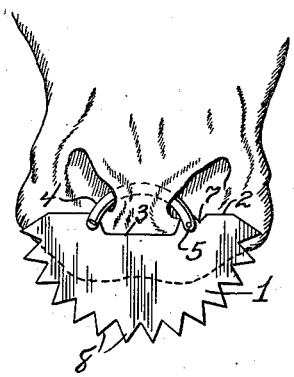
Figure 1 is a front view illustrating the weaning device in use.

The upper portion of the plate is provided with a recess 3 extending centrally and inwardly from the upper edge thereof, and the recess is preferably provided with diverging sides rounding at their lower ends into a straight bottom edge, in order to substantially fit the corresponding portion of the nose of the animal as suggested in Figure 1.

Figure 4:
Figure 4 is a top plan view thereof.

The attaching means for the device is shown as being an arcuate link 4 in the form of a bail, and the ends of the link 4 are slotted or bifurcated to receive the body plate therein, so that the bifurcated portions are disposed upon opposite sides of the plate as best shown in Figure 4. One end of the link 4 is pivotally secured to the body plate by a rivet or like securing means 5, and the opposite end is provided with an opening that intersects the slot thereof, and is adapted to register with a like opening in the plate to receive a cotter pin or like removable securing means 6, therefore it will be seen that the link bridges the recess and can be readily swung on its pivot to opened or closed position, as shown in full and dotted lines in Figure 2. In order to allow the link to be fully opened to facilitate the application of the device to the animal's nose, it will be noted that a notch 7 is provided in the upper edge of the plate for disposal in the path of the outer edge of the inner wall of the slot of the secured end of the link, and by employing the notch for that purpose, it will be obvious that the link can be secured to the plate a greater distance below the upper edge 2 thereof which materially adds to the strength of the device, and prevents the link from being torn therefrom, and at the same time allows for a better fit of the device with respect to the animal's nose.

The arcuate edge of the body plate is notched, throughout the length thereof, to provide teeth 8 that extend outwardly therefrom, and these teeth act to penetrate or scrape the skin of an animal when an attempt is made to nurse the same, and as the teeth extend about the entire arcuate edge of the plate, one or more thereof will be disposed in a position for use, regardless of the manner in which the animal wearing the device may attempt to nurse or draw milk from another animal or herself.

In the application of my device to an animal's nose, it will be obvious upon inspection of Figure 1, that the arcuate link or bail 4 is disposed through the septum or cartilage of the nose, and when fixed accordingly, removal on the part of the animal or accidental loss therefrom is practically impossible, and such is an extremely important feature in a weaning device, as some of the devices now in general use have proven impractical, due to the fact that they are easily removed and thereby become lost. It is of course to be understood that the link 4, as well as the device in its entirety is made from some non-corrosive metal, to prevent infection or the like, and as the device is mounted for swinging movement with respect to the nose, it will not prevent or materially interfere with the animal eating in a normal manner, yet the plate acts as a complete shield which cooperates with the teeth to prevent nursing.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:

A weaning device comprising a flat semi-circular body plate providing a straight upper edge and an arcuate edge, teeth extending outwardly from the arcuate edge for the entire length thereof, said plate having a recess extending centrally in the upper edge thereof, and means for attaching the plate to an animal's nose and including an arcuate link having its opposite ends slotted to receive the plate therein, said link having one end pivotally secured to the plate on one side of the recess and at a considerable distance from said upper edge of the plate, and means for detachably securing the opposite end of the link to the plate on the other side of the recess and at a considerable distance from said upper edge of the plate, said plate having its upper edge notched adjacent to the pivot of the link to accommodate the outer edge of the inner wall of the slot at the pivoted end of the link, whereby opening of the link is facilitated.

CHARLES E. BOLDT.